(12) United States Patent
Kalwa

(10) Patent No.: US 11,992,967 B2
(45) Date of Patent: May 28, 2024

(54) DEVICE FOR DEPOSITING VENEERS

(71) Applicant: Flooring Technologies Ltd., Kalkara (MT)

(72) Inventor: Norbert Kalwa, Horn—Bad Meinberg (DE)

(73) Assignee: Flooring Technologies Ltd., Kalkara (MT)

( * ) Notice: Subject to any disclaimer, the term of this patent is extended or adjusted under 35 U.S.C. 154(b) by 0 days.

(21) Appl. No.: 17/920,922

(22) PCT Filed: Apr. 22, 2021

(86) PCT No.: PCT/EP2021/060560
§ 371 (c)(1),
(2) Date: Oct. 24, 2022

(87) PCT Pub. No.: WO2021/214241
PCT Pub. Date: Oct. 28, 2021

(65) Prior Publication Data
US 2023/0158705 A1 May 25, 2023

(30) Foreign Application Priority Data
Apr. 24, 2020 (EP) .................................. 20171402

(51) Int. Cl.
*B32B 41/00* (2006.01)
*B27D 1/04* (2006.01)
(Continued)

(52) U.S. Cl.
CPC ............... *B27D 1/04* (2013.01); *B32B 37/12* (2013.01); *B32B 37/18* (2013.01);
(Continued)

(58) Field of Classification Search
CPC .......... B27D 1/04; B32B 37/12; B32B 37/18; B32B 38/1841; B32B 41/00; B32B 2309/72; B32B 2317/16; E04F 15/045
(Continued)

(56) References Cited

U.S. PATENT DOCUMENTS

2003/0196739 A1   10/2003   Nakaoda
2016/0067879 A1*   3/2016   Capps, Jr. ............... B32B 41/00
                                                           156/60

FOREIGN PATENT DOCUMENTS

EP         1749627 A1    2/2007
WO      2015078443 A1    6/2015

OTHER PUBLICATIONS

International Search Report dated Jul. 16, 2021 for corresponding application PCT/EP2021/060560.

* cited by examiner

Primary Examiner — Michael N Orlando
Assistant Examiner — Joshel Rivera
(74) Attorney, Agent, or Firm — Bachman & LaPointe, P.C.

(57) ABSTRACT

The invention relates to a device for depositing veneers on a carrier board. In order to create a device and a method by which veneers can be applied to a carrier board particularly easily, quickly and precisely, provided in the region of an upper end of a transporting device is a veneer magazine, with at least two compartments which are designed to store and supply veneer strips, and with means for transferring the veneer strips from the compartments to the transporting device, wherein the transporting device extends from an upper end obliquely downwards in the direction of a lower end in the region of a transporting plane for the carrier board and is designed to transport at least two individual adjacent (Continued)

veneer strips from the upper end to the lower end and to deposit them on the carrier board.

16 Claims, 2 Drawing Sheets

(51) Int. Cl.
 *B32B 37/12*  (2006.01)
 *B32B 37/18*  (2006.01)
 *B32B 38/18*  (2006.01)
 *E04F 15/04*  (2006.01)

(52) U.S. Cl.
 CPC .......... *B32B 38/1841* (2013.01); *B32B 41/00* (2013.01); *E04F 15/045* (2013.01); *B32B 2309/72* (2013.01); *B32B 2317/16* (2013.01)

(58) Field of Classification Search
 USPC .................... 156/60, 64, 350, 351, 378, 379
 See application file for complete search history.

DEVICE FOR DEPOSITING VENEERS

BACKGROUND OF THE INVENTION

The invention relates to a device and a method for depositing veneer strips on a carrier board.

The device and the method can in particular be applied when manufacturing veneer floors. The latter comprise a carrier board having a real wood veneer surface which is bonded to the carrier board by means of a synthetic resin, wherein the synthetic resin penetrates the veneer during pressing so that a particularly resistant real wood surface is created. Devices for conveying veneers are known, e.g., from US 2003/196,739 A1, EP 1 749 627 A1 or WO 2015/078443 A1.

In order to manufacture the veneer floors, a synthetic resin layer is arranged above the carrier board and a veneer layer is arranged on the synthetic resin layer. The package made up of layers stacked on top of one another is pressed together in a short-cycle press under the influence of pressure and heat. Following pressing, post treatment takes place, which comprises inter alia separating and cutting the veneer-coated carrier boards to form floorboards and, for example, arranging locking profiles on the sides.

Such floorboards are known, for example, from WO 2015/078443 A1. The real wood veneer surface is produced, for example, by veneers which consist of individual veneer strips which are glued or stitched to one another and laid on the carrier board. Although such large-format veneer formats are particularly suitable for the process, they are relatively expensive. In addition, it is accepted that the veneer located in the regions where the profiles are later milled is lost. This increases the costs and reduces choices at suppliers. The process of laying individual veneer strips next to one another, leaving a gap for the later split cut, and laying the profile on the carrier board is also known. The laying process is carried out, for example, by means of laying stations which suck in the veneers or veneer strips and subsequently deposit them in the correct position on the carrier board. This method can result in material cost savings.

The process of arranging the veneers on the carrier board by means of a laying station is time-consuming and, consequently, expensive. The veneers are also easily damaged when they are transported with vacuum lifters. In addition, veneers or respectively veneer strips have a tendency to warp, making it even more difficult to position the veneers exactly.

SUMMARY OF THE INVENTION

Consequently, the object which forms the basis of the invention is to create a device and a method by which veneers can be applied to a carrier board particularly easily, quickly and precisely.

The invention is solved by a device as disclosed herein and a method also as disclosed herein. Advantageous developments of the invention are depicted in the disclosure and also in the dependent claims. All of the described features separately or in any combination basically form the subject-matter of the invention, irrespective of whether they are summarized in the claims or referred back to.

The device according to the invention for depositing veneers on a carrier board comprises, in the region of an upper end of a transporting device, a veneer magazine with at least one compartment which is designed to store and supply veneer strips, and means for transferring the veneer strips from the compartments to the transporting device, wherein the transporting device extends from an upper end obliquely downwards in the direction of a lower end in the region of a transporting plane for the carrier board and is designed to transport at least two individual adjacent veneer strips from the upper end to the lower end and to deposit them on the carrier board.

Feeding the individual veneer strips via an inclined plane formed by the transporting device makes it possible to feed the veneers or respectively veneer strips to the carrier board particularly easily and quickly. In addition, the transporting device offers the possibility of pre-positioning the veneers in an optimal manner so that when the veneers are deposited by the transporting device on the carrier board, the veneer strips are already in an at least largely optimal position on the carrier board. The tendency of the veneers to warp is counteracted by being transported on the transporting device and the fact that the veneers are supported from below when transported on the transporting device.

A further advantage of the invention is that such a device can usually be integrated into an existing coating system for carrier boards without any problems, as it only requires a small installation space above the actual transporting plane of the carrier board.

The transporting device is, for example, designed as a transport chain or conveyor belt. It can have a multi-part design so that, for example, multiple individual conveyor belts are next to one another which, together, form the transporting device. Thus, the transporting device can have a transport section, for example, a conveyor belt, vacuum conveyor or similar for each veneer strip which, in turn, together make up the transporting device.

The transporting device extends obliquely downwards in the direction of the transporting plane of the carrier board. This means that the transporting device forms an inclined plane extending obliquely upwards from the transporting plane of the carrier board. The inclined plane, i.e., the plane formed by the transporting device, along which the veneers are transported, is arranged at an angle of ≠0° to the transporting plane. Consequently, the veneers experience both a movement in the horizontal direction and in the vertical direction during transport on the transporting device. The transporting device has two opposite ends (upper end, lower end). Both ends of the transporting device lie above the transporting plane for the carrier board. In order to lay the veneer strips on the carrier board, the carrier board is usually moved in a transport direction and along its transporting plane. The lower end of the transporting device is arranged in the vertical direction beneath the upper end and in the transport direction behind the upper end.

The transporting device is designed to receive at least two veneer strips which are arranged, for example laid, separately from one another on the transporting device. This means that the veneers are arranged next to one another transversely to their longitudinal axial direction which corresponds to the transport direction.

A veneer strip is in particular understood to be a veneer which is at least longer by a factor of 1.5 in relation to its width. Veneers per se are known and made of leaf-like wooden components manufactured from solid wood. Veneers usually have a thickness in the range between 0.5 mm and a maximum of 10 mm. For veneer floors veneers having a width in the range of between 8 cm and 30 cm and a length of several meters are usually used. The veneers are manufactured by slicing, peeling or sawing solid wood.

However, within the framework of this invention, those veneers are referred to as veneer strips which are joined from individual veneer parts and whose dimensions can be so large that the entire carrier board is covered with one veneer strip.

The veneer strips can be untreated in terms of the binding to the carrier board. The binding to the carrier board is carried out, in this case, by a synthetic resin-impregnated non-woven fabric, in particular a paper or a scrim made of synthetic fibers or mineral fibers or a mixture of natural, synthetic and/or mineral fibers, but a synthetic resin-impregnated woven fabric can also be deployed. However, according to a further development of the invention, the veneer strips can also be provided with a binding agent on at least one side. Optionally, additives, e.g., dyes, means for staining the veneer or fire retardants can be arranged in the binding agent or between the binding agent and veneer. If the binding agent is already provided on the veneer, then it is possible to dispense with a synthetic resin-impregnated non-woven fabric or woven fabric and the veneer is connected directly to the carrier board in the press.

The veneer magazine is a container for the veneer strips. The magazine can, for example, be designed as a box. The veneer magazine can be open on one side or can be opened at least on one side. In particular, the veneer magazine has a filling opening for inserting the veneers into the magazine and a discharge opening, from which the veneers can be extracted and moved onto the conveyor belt. The filling opening and the discharge opening can be identical.

In addition, the veneer magazine has at least one compartment, preferably two or more compartments, in which veneer strips are stored in each case. A compartment can be understood to be an already divided section of the veneer magazine for storing veneer strips. The compartments can also be separate components which, assembled, for example, form the veneer magazine. The veneer strips are preferably stacked on top of one another, i.e., as a stack of veneers (hereinafter also referred to as a veneer package) in the veneer magazine or respectively in the compartments. The compartments are in particular designed to receive and store the veneer strips in packages, i.e., there is usually a stack of veneers respectively in each compartment. In addition, the compartments make it possible to extract (supply) the individual veneer strips easily from each of the compartments in order to arrange them on the transporting device.

The compartments or respectively the veneer magazine is/are arranged in such a manner that they effect a first pre-positioning for the veneer strips on the transporting device. This is in particular to be understood to mean that the compartments are already aligned next to one another in a transverse direction pointing transversely to the transport direction inasmuch as the veneers have to primarily only be moved in the transport direction during the transfer to the transporting device.

In addition to the veneer magazine, the device according to the invention can also have a magazine for the synthetic resin-impregnated non-woven fabric or woven fabric, as well as a corresponding transporting device which likewise corresponds to the transporting device for the veneer strip(s). During the laying of veneer strips on the top side of the carrier board in the transport direction or respectively during the course of the method, the magazine for the synthetic resin-impregnated non-woven fabric or woven fabric is upstream of the veneer magazine(s). The non-woven fabric or woven fabric is first laid on the carrier board and only then are the veneer strips applied. If the bottom side of the carrier board is also provided with veneer strips, a magazine for synthetic resin-impregnated non-woven fabrics or woven fabrics is arranged downstream of the veneer magazine.

A carrier board is in particular understood to be a board material, for example, a wood-based board such as a fiberboard, wood veneer board, OSB (oriented strand board) or particle board. The carrier boards can also already have multiple layers prior to the laying of the veneer strips. Thus, in connection with the invention, a stack of veneers, adhesive layers and/or board materials can, for example, also be understood to be a board material on which the veneer strips are laid.

The veneer strips are laid on the carrier board in a predefined position. In this case, the veneer strips can be deposited directly against one another, i.e., in contact with one another or spaced apart, i.e., with a gap between the veneer strips. A gap between the veneer strips on the carrier board is advantageous, if the veneered carrier board is divided into individual panels. In this case, the kerf lies between the veneer strips, avoiding a loss of veneer. The same applies if the panels are provided with a profile at the edges. Here, too, the edges can be profiled in a region of the veneered carrier board which has no veneer.

According to a further development of the invention, an adjusting device is arranged for moving the transporting device with respect to the transporting plane, wherein an angle between the inclined plane formed by the transporting device and the transporting plane can be adjusted by means of the adjusting device between 10° and 60°, particularly preferably between 10° and 45°, and/or the vertical distance of the lower end of the transporting device from the transporting plane can be changed.

As a result, the adjusting device enables, in particular, to adapt the device to veneer strips of different thickness. This is advantageous since, depending on the thickness of the veneer strips, transfer difficulties can occur during the transition of the veneer strips from the transporting device onto the carrier board, for example the veneer strips can slip transversely to the transport direction. Said difficulties can be reduced or respectively completely prevented by adjusting the angle between the transporting device and the transporting plane of the carrier board, which is ultimately aligned parallel to the panel surface. Flatter angles in the range of 10° to 20° are preferably adjusted for thicker veneers in the range of, for example, 2 mm and thicker, and steeper angles, for example in the range of 20° to 45°, are adjusted for thinner veneers (e.g., <2 mm, in particular of 0.6 mm+/−0.2 mm).

The means for transferring the veneer strips from the compartments to the transporting device can have different designs. Thus, it is conceivable, for example, that the veneers are pulled out of the compartments by means of a pulling device and are deposited on the transporting device. However, the means for transferring are particularly preferably designed as vacuum suction cups which suck in the veneers, hold them and lay them on the transporting device, in particular in the region of the upper end.

The means are designed in such a manner that they extract the pre-positioned veneers from the compartments at least largely without a substantial change in the transverse position in the direction lengthwise to the transport direction and deposit them on the transporting device.

In order to prevent a displacement of the veneer strips resting on the transporting device, a corresponding fixing device can be arranged. This can, for example, comprise corresponding retaining brackets or retaining strips. However, according to a further development of the invention, a vacuum device is provided for generating a vacuum on the transporting device in order to fix the veneer strips on the transporting device. The vacuum device sucks the veneer strips from the bottom side firmly onto the transporting device, for example onto a conveyor belt, so that a displacement of the veneer strips in the transport direction or transversely to the transport direction is safely prevented.

According to a further development of the invention, in order to improve the pre-positioning of the veneer strips in the veneer magazine or respectively in the compartments of the veneer magazine, a displacement device is arranged for moving the veneer magazines and/or the compartments in the direction transversely to the transport direction (transverse direction). The displacement means can be designed either to displace the entire magazine or to displace individual compartments. As a result, the individual veneer strips can be easily aligned particularly accurately in the direction transversely to the transport direction even prior to being laid on the transporting device. The veneer magazine or respectively the compartments can also be adjusted for different veneer widths.

In order to increase the flexibility of the veneer magazine with respect to different veneer strips and different veneer strip dimensions, the veneer magazine particularly preferably has 3 to 10 adjacent compartments. The compartments are usually designed to receive different veneer widths.

The displacement device is in particular designed in such a manner that at least individual compartments or, for example, compartment-creating partition sections (partitions, etc.) can be moved out of the working region of the transporting device in the direction transversely to the transport direction if, for example, the working region of the transporting device is already covered with particularly wide veneers.

In accordance with the preferred number of 3 to 10 compartments, the transporting device is also preferably designed to transport 3 to 10 individual adjacent veneer strips. As a result, narrow and, consequently, low-cost veneer strips can also be used. It is, for example, also possible to configure the distances between individual veneer strips differently.

In order to further improve the pre-positioning of the veneer strips, a positioning aid for pre-positioning the veneers is arranged in the veneer magazine, alternatively or additionally to the displacement device. With the positioning aid, the position of the veneer strips can be changed in the direction transversely to the transport direction in the veneer magazine, or respectively in the compartments. In addition, the positioning aid can also be designed to change the position of the veneer strips in the transport direction. The positioning aid is preferably designed to move, in each case, an entire stack of veneers accordingly in the veneer magazine and/or the individual compartments. Alternatively or additionally, the positioning aid can, however, also be designed to always align the veneer strips next to be used from each veneer stack in their position transversely to the transport direction. The positioning aid can be designed, for example, as a pushing device for displacing the individual veneer strips/veneer stack or as a lifting device for raising and depositing the strips.

According to a further development of the invention, in order to further improve the position of the veneer strips on the carrier board, a device for moving the veneers on the transporting device in the direction transversely to the transport direction is arranged. This device makes it possible to once again change the position of the individual veneer strips in their own right, in each case, in the direction transversely to the transport direction. As a result, an incorrect positioning can in particular be remedied even prior to laying the veneer strips. The device for moving the veneers on the transporting device in the direction transversely to the transport direction can, for example, be formed by means of transversely-acting conveyor belts. Corresponding vacuum conveyors are particularly preferably arranged, which move the veneer strips transversely to the transport direction. The device is in particular designed to move each veneer strip individually, so that each veneer strip can be individually brought into its particular position.

A monitoring system is particularly preferably arranged for detecting the position of the veneer strips on the transporting device, which monitoring system determines the position of the veneer strips on the conveyor belt. The monitoring system is in particular designed as a camera system which optically detects the veneer strips on the transporting device and transmits the data to a corresponding control unit. The control unit can, in turn, be coupled, for example, to the device for moving the veneers on the transporting device and can actuate the latter in accordance with the data detected by the monitoring system in order to adapt the transverse positioning of the veneer strips on the transporting device and, therefore, ensure an exact positioning on the carrier board.

In order to lay the veneer strips on the carrier board, the carrier board is usually moved in the transport direction and along its transporting plane. The transporting device arranged above the transporting plane moves the veneer strips, coming obliquely from above, onto the carrier board. This is usually carried out automatically in that the speed and start time of the transporting device are matched to the position and the transport speed of the carrier board. According to a further development of the invention, in order to improve the efficiency of the manufacturing process, a synchronization device for synchronizing the transport of the carrier board with the transporting device is arranged. The synchronization device is in particular designed to adapt the speed of the transporting device, i.e., the speed of movement of the veneer strips, in such a manner that an optimal longitudinal positioning of the veneer strips on the carrier board is achieved. For this purpose, appropriate devices for detecting the carrier board are preferably arranged, which are connected to the synchronization device and communicate the respective position of the carrier board to it. The synchronization device can also be coupled to the monitoring system and receive and evaluate data from the synchronization device regarding the position of the veneer strips and then utilize said data to actuate the transporting device. The control unit of the monitoring system can also be designed, for example, to actuate not only the device for moving the veneer strips, but also the synchronization device in each case depending on the detected position of the veneer strips on the transporting device and/or of the position of the carrier board.

According to a further development of the invention, it is provided that at least two veneer magazines are arranged behind one another in a transport direction of the veneer strips. The two veneer magazines provided behind one another in the transport direction can either be utilized to arrange two layers of veneers above one another or to accordingly locate the veneer strips of one layer next to one another. Especially in those cases where the veneer strips are positioned on the carrier board with a very small distance, it can be very helpful to apply the veneer strips to the carrier board by means of two veneer magazines arranged behind one another. The second veneer magazine can of course be designed in accordance with the aforementioned embodiments and can also have all the corresponding features, control units and previously described properties of the first veneer magazine.

The object of the invention is further achieved by a method for depositing veneer strips on a carrier board, having the steps of: positioning at least two veneer strips next to one another and at a predefined distance from one another on a transporting device, moving the veneer strips by means of the transporting device along an obliquely downwards inclined plane to a lower end of the transporting device, simultaneously transferring the veneer strips from the transporting device onto the carrier board in such a manner that the veneer strips are deposited on the carrier board next to one another and at a predefined distance from one another on the carrier board.

The positioning of the veneer strips on the transporting device with the predefined distance and the feeding of the veneer strips by means of the transporting device, which deposits the veneer strips on the carrier board coming obliquely from above, makes it possible to lay the veneer strips on the carrier board easily, quickly and precisely. In addition, the transporting device offers an advantageous possibility of pre-positioning the veneer strips particularly precisely.

The transporting device is in particular designed as a conveyor belt so that the veneer strips are laid, for example, on the upper end of the conveyor belt. The conveyor belt extends from the upper end obliquely downwards in the direction of the transporting plane of the carrier board. The conveyor belt extends along an inclined or an inclined plane or forms this itself.

The predefined distance is in particular understood to mean that a gap, i.e., a space, is formed between the two veneer strips. The veneer strips deposited on the carrier board are therefore preferably not in contact with one another. Such a gap preferably has a width in the range of approx. 5 mm to 5 cm and is preferably constant over its length, i.e., the outer edges of the two veneers are parallel to one another. It should be noted that the veneer strips as such usually also have at least two parallel longitudinal edges.

In particular cases, it can be advantageous if the veneer strips or at least some of the deposited veneer strips are arranged in such a manner that they form a closed surface. In this case, the veneer strips with their respective outer edges pointing towards one another are arranged directly against one another (they are in contact), so that no gap or space is formed. In such an embodiment, the predefined distance is 0 mm+/−0.25 mm.

To transport the veneer strips safely and to retain the position thereof particularly precisely on the conveyor belt, said veneer strips are fixed during transport with the transporting device. For this purpose, the veneer strips are preferably sucked in, i.e., the veneer strips are sucked in from their bottom. A vacuum suction device can be arranged in the region of the transporting device for this purpose.

The veneers are preferably supplied in a veneer magazine which is arranged in the region of the upper end of the transporting device. The veneer strips are stacked, i.e., deposited as a stack of veneers, in the veneer magazine which can in addition have individual compartments.

The veneer strips can, for example, be pulled by means of a pulling device from the veneer magazine onto the conveyor belt. However, they are advantageously gripped by means of a vacuum suction cup in the region of the veneer magazine and are deposited on the conveyor belt in a predefined position, i.e., they are pre-positioned on the belt. In order to simplify the transfer of the veneer strips from the veneer magazine onto the transporting device, it is provided, according to a further development of the invention, that the veneer magazine and/or compartments of the veneer magazines, in which the veneer strips are stored, are moved transversely to the transport direction for a pre-positioning. The veneer magazine and/or the compartments take up a position in which the veneer strips present in the veneer magazine or the compartments largely take up their target position on the transporting device, at least in the direction transversely to the transport direction.

This ensures that the veneer strips are already located at least largely in the correct position in the direction transversely to the transport direction prior to the transfer to the transporting device so that they primarily only experience a movement in the direction of the later transport direction during the transfer from the veneer magazine to the transporting device.

In order to specify the position of the veneer strips on the transporting device more precisely and in order to remedy a possible incorrect positioning, it is provided, according to a further development of the invention, that the veneer strips on the transporting device are detected by a monitoring system and, in the event of a deviation from a target position, are moved transversely to the transport direction. The monitoring system is in particular designed as a camera system which forwards the detected data to a corresponding control unit. The veneer strips are, in turn, moved on the transporting device in the direction transversely to the transport direction by way of a corresponding device for moving the veneer strips on the transporting device. Thus, corresponding transversely-acting conveyor belts, for example vacuum conveyors, can be arranged for example. Each veneer strip can preferably be actuated individually and moved transversely to the transport direction.

In order to further improve the depositing of the veneer strips on the carrier board, it is provided, according to a further development of the invention, that the transport of the veneer strips is adapted to a transport of the carrier board so that the veneer strips experience an optimal longitudinal positioning on the carrier board. A synchronization device is in particular arranged for this purpose, which can in particular adapt the transport speed of the veneer strips on the transporting device, i.e., for example the speed of the conveyor belts of the transporting device. In addition, the synchronization device is preferably designed to detect and to process the carrier board and, in particular, the transporting speed and transport position. The synchronization device can also, for example, be coupled to the monitoring system, so that the veneer strips detected by the monitoring system and the position thereof are also included into the synchronization control.

The veneer strips can be directly deposited on the carrier board, if they are coated with a binding agent on the side facing the carrier board. In this case, the top side of the carrier board can have markings, preferably colored markings, in particular if the veneer strips are to be applied to the carrier board at a predefined distance from one another. If a veneer which is not provided with a binding agent is applied to the carrier board, a non-woven fabric or woven fabric impregnated with synthetic resin is preferably inserted between the veneer strip and the surface of the carrier board, onto which the veneer strip is to be applied. If the veneer strips which are not provided with binding agent are to be applied to the carrier board at a predefined distance from one another, a marking, preferably a colored marking, can be applied to the synthetic resin-impregnated paper or non-woven fabric. The marking can be indicated in a simple form as a marking of at least two corner points of the position of the respective veneer strip. However, the marking can also be applied to the paper or respectively non-woven fabric as a complete outline of the position of the respective veneer strip or as a planar marking of a contact surface of the veneer strip on the paper or non-woven fabric or respectively the carrier board. The advantage of the colored marking is the easy recognizability of the predefined position for the veneer strip on the carrier board or respectively the synthetic resin-impregnated paper or overlay, additionally with the possibility of checking whether the veneer strip is correctly deposited. Finally, this now also makes it possible to, optionally, subsequently correct the position of the veneer strip on the carrier board or respectively the synthetic resin-impregnated paper or non-woven fabric.

For this purpose, the device according to the invention is advantageously equipped with a means for monitoring the position of the veneer strip on the carrier board or the synthetic resin-impregnated paper or non-woven fabric, e.g., with a camera or other means for preferably optically detecting the position of the veneer strip. Optionally, the device can also have means for correcting the position of the veneer strip on the carrier board or the synthetic resin-impregnated paper or non-woven fabric, for example means which make it possible to displace the veneer strip in a targeted manner in the transport direction or transversely thereto or to rotate the veneer strip which is not positioned as envisaged. Said means can be designed as slides or as grippers which act on the veneer strips.

In accordance with an advantageous embodiment of the invention, if a carrier board is to be veneered on both sides, a second device for depositing veneer strips is provided, which can have the same design, in terms of all its features, as the device according to the invention described above. Veneer strips are deposited on a conveyor belt by means of this device. If the veneer strips are coated with a binding agent, the side coated with the binding agent also points towards the carrier board, that is to say upwards in this case. If the veneers are untreated, a synthetic resin-impregnated paper or non-woven fabric is deposited on the veneer strip(s). The carrier board is then deposited on the veneer strip or respectively veneer strips or respectively the paper or non-woven fabric. The carrier board resting on the veneer strip(s) or respectively the paper or non-woven fabric is then—as described above—coated with one or more veneer strips, if applicable after inserting a synthetic resin-impregnated paper or non-woven fabric.

The stack thus produced, made up of the carrier board and veneer strips applied on one side or on both sides, if applicable with synthetic resin-impregnated non-woven fabric or woven fabric, is then pressed in a press under the influence of pressure and heat, so that the veneer strip(s) connect to the carrier board.

Although some aspects have been described in connection with a device, it is understood that these aspects also constitute a description of the claimed method so that a block element or a component of one of the described devices is also understood to be a corresponding method step or a feature of a method step. Similarly, aspects which have been described in connection with one method step or as a method step, also constitute a description of a corresponding block or detail or feature of a corresponding device.

BRIEF DESCRIPTION OF THE DRAWINGS

The invention is explained in more detail below with reference to several exemplary embodiments, wherein.

DETAILED DESCRIPTION

Example 1 describes the basic principles of the individual method steps for manufacturing a veneer floor, using a device for depositing veneer strips.

Figure 1:
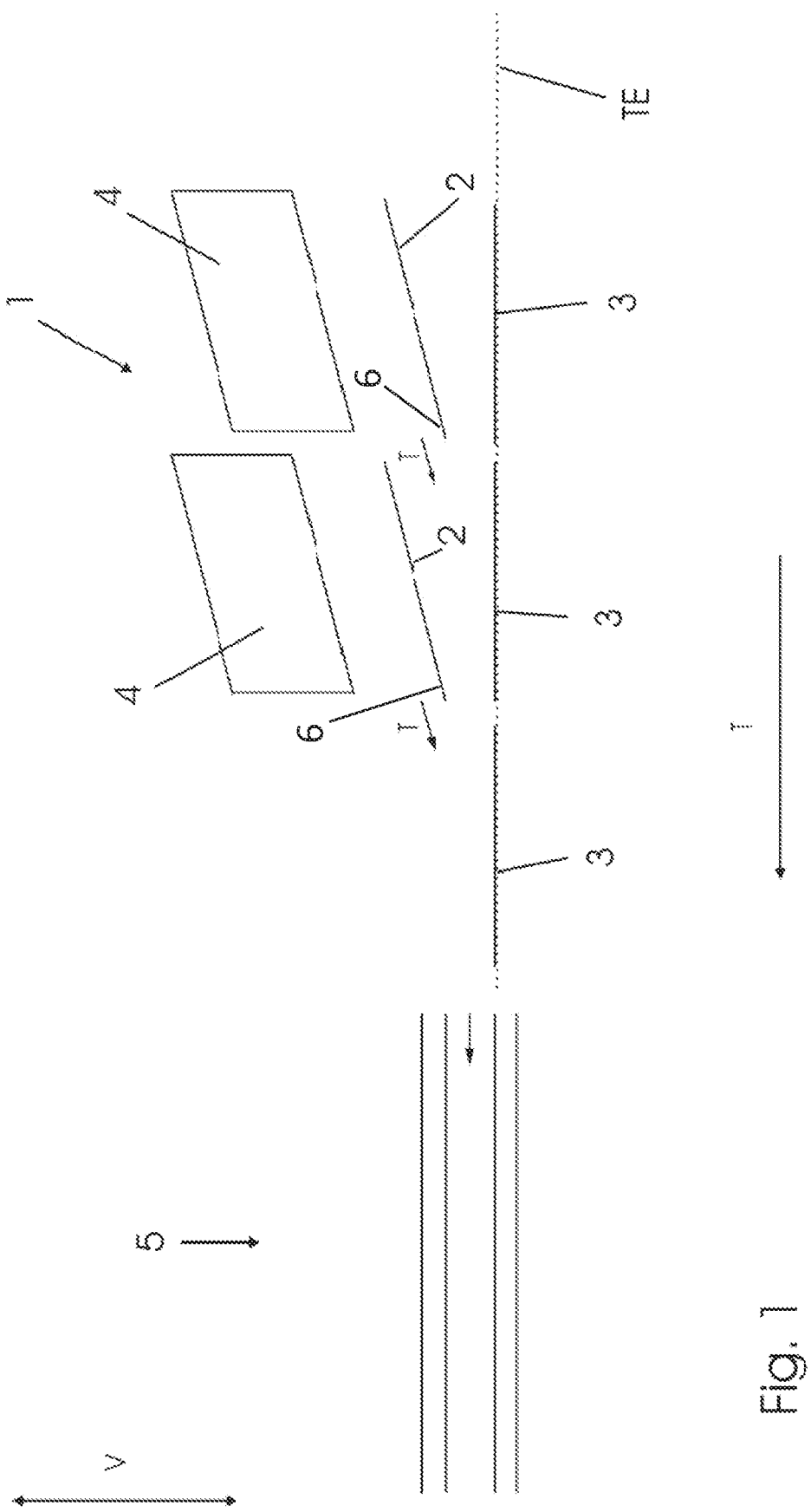
FIG. 1 schematically shows a side view of a device for depositing veneer strips on a carrier board and a short-cycle press.

FIG. 1 shows a side view of a device 1 for depositing veneer strips 8 (see FIG. 2) on a carrier board or panel 3. The device 1 comprises two veneer magazines 4 which are arranged behind one another in the transport direction T. Each veneer magazine 4 is assigned a transporting device 2 arranged in the vertical direction V beneath the veneer magazines. The transporting devices 2 comprise conveyor belts for transporting veneer strips (not depicted here) coming from the veneer magazines 4 onto the carrier boards 3. The transporting devices 2 are arranged, extending obliquely upwards thereby starting from a transporting plane TE of the carrier panels 3 opposite the transport direction T. Each transporting device 2 consequently forms an inclined plane.

The carrier boards 3 are likewise moved along the transporting plane TE in the transport direction T by a transporting device (not depicted here) under the devices 1 and through the transporting devices 2 to a short-cycle press 5.

The lower ends 6 of the transporting devices 2 adjoin the transporting plane TE, so that veneer strips 8 coming from the transporting device 2 are laid on the carrier boards 3 moving in the transport direction T and carried along by said carrier boards.

The stack (not depicted here) made up of the carrier board 3 and laid veneer strips 8, if applicable supplemented by further layers, is moved into the short-cycle press 5 and pressed there under the influence of pressure and heat. During the manufacture of the veneer floors, the synthetic resin which is liquid under heat and pressure penetrates into the veneer strips 8, glues these to the carrier board 3 and forms a particularly resistant surface.

Figure 2:
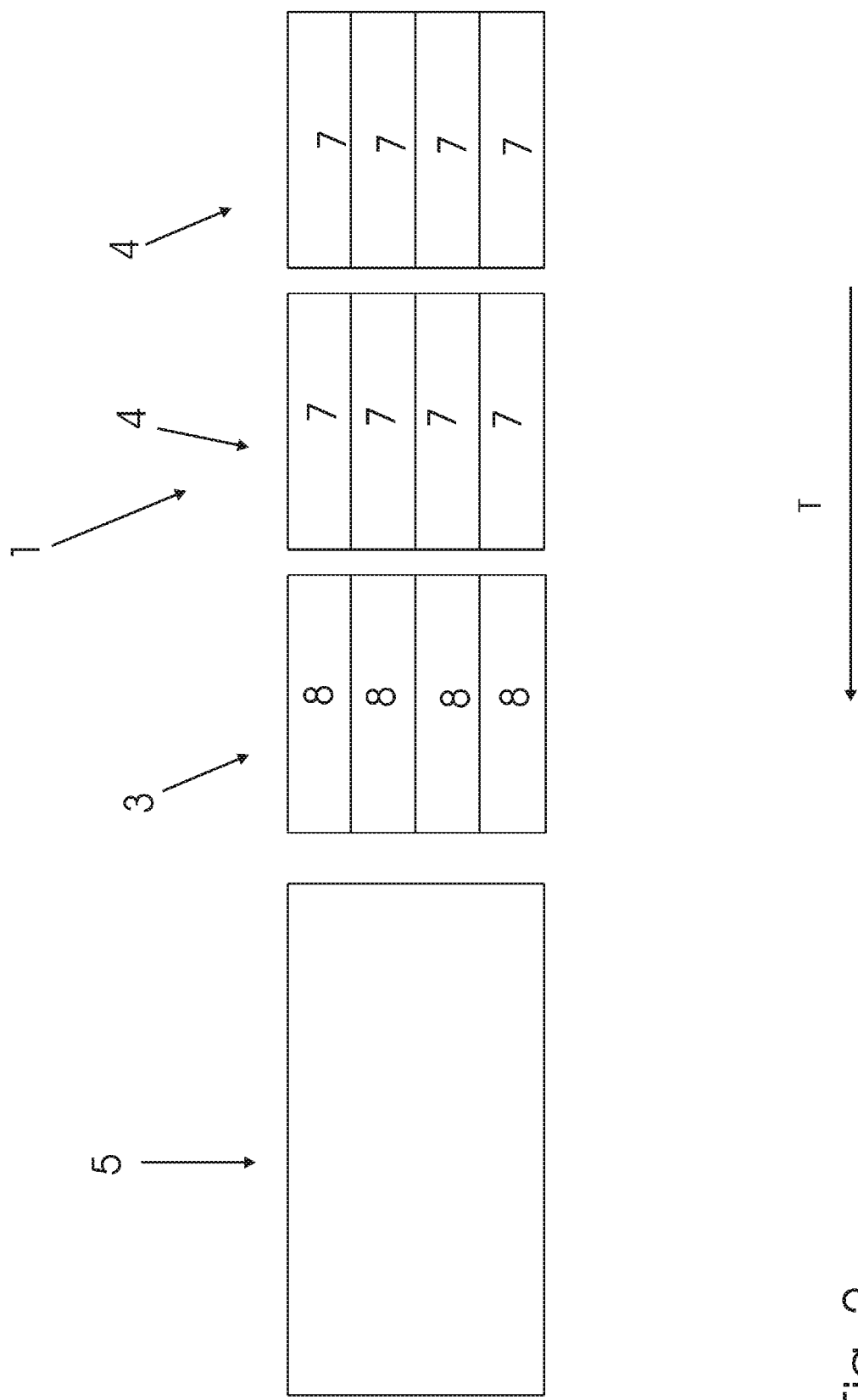
FIG. 2 schematically shows a top view of the device from FIG. 1.

FIG. 2 schematically shows a top view of the device from FIG. 1. The two veneer magazines 4 which each have four adjacent compartments 7 transversely to the transport direction T can be clearly seen. A stack of veneer strips 8 is inserted into each compartment 7. In the transport direction T behind the two veneer magazines 4, a carrier board 3 is depicted, on which four veneer strips 8 are laid next to one another. The veneer strips 8, not depicted here, are laid on the carrier board 3 at a distance from one another and precisely positioned in a target position. The stack made up of the carrier board 3 and veneer strips 8 is ready to be moved into the short-cycle press 5 and pressed therein.

Example 1

In the following, the manufacture of a veneer floor with the aid of the device for depositing the veneer strips 8 is explained, by way of example, on the basis of an exemplary embodiment. In order to manufacture the veneer floor, a full-format counter veneer is presented in a pulling device upstream of a short-cycle press 5. The veneer can, for example, be a poplar veneer having a thickness of 0.7 mm and a format of 2,800 mm×2,070 mm. A synthetic resin-impregnated non-woven fabric or woven fabric, here a melamine resin-impregnated paper, a so-called overlay, for example having a paper weight of 25 g/m² and a final weight of 160 g/m² at a Vc value of 6% in the same format as the veneer, is pulled onto this veneer. In addition to the melamine resin, the overlay contains the usual auxiliary substances such as hardeners, etc. In the next station, an 8 mm HDF in the same format as the veneer is deposited. Thereafter, a further overlay having the same parameters as the previous one is deposited. In addition, a quantity of 15 g fl./m² of a black digital print ink was applied to this overlay. The stack thus manufactured, which is made up of the counter layer, overlay and HDF (hereinafter referred to as the carrier board 3) is transported along under the veneer magazines 4. In order to lay the veneer strips 8, veneer strips 8 made of oak having a format of 1,380 mm×300 mm×0.7 mm from a veneer magazine 4 having, for example, six compartments 7 are laid on a first half of the carrier board 3. This is carried out by lifting the oak veneers from the compartments 7 by means of a vacuum suction cup onto the transporting device 2 and being transported by the transporting device 2, which comprises vacuum conveyors, onto the overlay lying on the HDF. The compartments 7 were previously pre-positioned in accordance with the target position on the carrier board 3 transversely to the transport direction T. During the transport with the transporting device 2, the veneer strips 8 were, in addition, detected by a monitoring system and in the event of a deviation from the target position being detected, moved by means of a device transversely to the transport direction T. For an exact longitudinal positioning of the veneer strips 8 on the carrier board 3, a synchronization of the speed of the transporting device to the position and speed of the carrier board was, in addition, performed by a synchronization device.

A first end of the veneer strips 8 is laid on the carrier board 3 and then they are carried along by the carrier board 3 moving in the transport direction T. The veneer strips 8 are laid at a distance of 40 mm from one another. In addition, the two outer veneer strips 8, in each case, are away 35 mm from a longitudinal edge of the carrier board 3. This ensures that any clamping strips or similar, which may be arranged, do not displace or damage the outer veneer strips 8 when receiving the carrier board 3. The distance from the transverse edge is 10 mm. This covering is repeated on the second half of the carrier board 3, wherein a distance of approx. 20 mm is provided between the veneer strips 8 in the longitudinal direction in the middle of the carrier board 3. The thus covered carrier board 3 is subsequently transported into the short-cycle press 5 and pressed, for example, at a pressing temperature of 180° C. and a pressure of 35 kilo/cm². Following the pressing and cooling, the large-format carrier boards 3 covered with veneer strips 8 and manufactured in this way are further processed to form floor coverings by means of a milling device, for example.

Example 2

This exemplary embodiment coincides with Example 1; deviating or supplementary aspects are solely explained separately in Example 2.

A first veneer strip, which is manufactured from composite, in particular glued, veneer parts, and which, having the dimensions of 2800 mm×2070 mm, has the size of the carrier board, is extracted from the veneer magazine of a second device for depositing veneer strips and is deposited by way of the associated transporting device on a conveyor belt which runs in the transporting plane. This first veneer strip serves e.g., as a counter layer or as a decorative surface.

If the veneer is a veneer coated on one side with binding agent, the side coated with binding agent points upwards. Alternatively, if it is an untreated veneer, then a synthetic resin-impregnated non-woven fabric or woven fabric, mostly a melamine resin-impregnated paper, is subsequently deposited on the conveyor belt. The non-woven fabric or woven fabric, which is likewise the length and width of the carrier board, is extracted from a magazine which is arranged in the transport direction downstream of the veneer magazine for the first veneer strips.

The carrier board, e.g., an 8 mm thick HDF board, is then laid on the veneer or respectively the binding agent layer thereof or on the synthetic resin-impregnated non-woven fabric or woven fabric. The carrier board resting on the veneer or respectively on the non-woven fabric or woven fabric is conveyed onwards in the transport direction. As described above for Example 2, either one or more veneer strips which are coated with binding agent, or a synthetic resin-impregnated non-woven fabric or woven fabric and at least one untreated veneer strip, but in the reverse order to that described above, are laid on the carrier board. Veneer strips and, if applicable, synthetic resin-impregnated non-woven fabric or woven fabric as described above are in each case extracted from a magazine and deposited on the carrier board by means of the transporting device. The carrier board which is thus covered on both sides, in each case, with at least one veneer strip and optionally inserted, synthetic resin-impregnated non-woven fabric or woven fabric is subsequently pressed in a press according to Example 1.

Example 3

This example also is based on Example 1 and only deviations from Example 1 are explained. The carrier board is conveyed in the transport direction in the transporting plane. Markings are affixed to the surface of the carrier board at a distance from one another, e.g., with a black or respectively colored ink or color. Alternatively, a synthetic resin-impregnated non-woven fabric or woven fabric is laid on the carrier board, wherein colored markings are affixed to the non-woven fabric or woven fabric.

The markings are either executed as dots or lines which indicate the position of one or more veneer strips. Two dots or lines are required, as a general rule, in order to predefine the position of a veneer strip. The markings are preferably produced with ink or color, but they can also be produced in a different way. The markings can also be designed as an area, in particular a colored area, wherein the area then indicates the position of the veneer strip or the area which is not covered by the veneer strip.

The distance of the veneer strips can, in principle, be freely chosen, but is mostly limited to a few mm or cm in order to avoid waste. E.g., a distance of up to 5 cm, preferably of up to 3 cm, can be deemed to be generally standard. The predefined minimum distance between two veneer strips can be 0.3 mm.

The veneers are e.g., positioned such that they cover individual boards which are to be manufactured from the veneered carrier board. The space between the markings is accordingly provided for the kerf. Optionally, the space can also comprise regions which are to be worked in order to produce a profile at the edges of the panels to be manufactured. Due to the arrangement of veneer strips at a distance from one another, the veneer is deployed in a targeted manner and without waste in order to produce decorative surfaces.

Example 4

According to a further development of Example 3, the device for depositing veneer strips on a carrier board comprises means for detecting the position of the veneer strip or respectively the veneer strips as well as the markings on the carrier board or respectively the synthetic resin-impregnated non-woven fabric or woven fabric, which means are arranged in the transport direction downstream of the at least one veneer magazine and the respective associated transporting device above the transporting plane. These means for detecting the position of the veneer strip or respectively the veneer strips, e.g., a camera, detect whether the markings are completely covered by the veneer strips or not. If the means for detecting the position detect at least one marking completely or partially, a corresponding signal then causes the control apparatus to operate means for correcting the position of the veneer strip on the carrier board or respectively the synthetic resin-impregnated paper. The control apparatus determines which movement of the veneer strip is required in order to reach the predefined position, in which all of the markings are completely covered. The means for correcting the position, e.g., a slide or a clamping device, are then brought into contact with the veneer by means of the control apparatus in order to displace or turn the veneer strip until the desired position is reached.

LIST OF REFERENCE NUMERALS

1 Device
2 Transporting device
3 Carrier board
4 Veneer magazines
5 Short-cycle press
6 Lower end
7 Compartments
8 Veneer strips
T Transport direction
TE Transporting plane

The invention claimed is:

1. A device for depositing veneer strips (8) on a support panel (3), comprising
a veneer magazine (4) in the region of an upper end of a transport device (2) with at least two compartments (7) that are designed to store and provide veneer strips (8),
means for transferring the veneer strips (8) from the compartments (7) to the transport device (2),
wherein the transport device (2) extends from an upper end obliquely downward toward a lower end in the region of a transport plane (TE) for the support panel (3), and is designed to deposit at least two individual veneer strips (8) arranged next to each other from the upper end to the lower end and to deposit them on the support panel (3) and further comprising:
a displacement device for moving the veneer magazines (4) and/or the compartments (7) in a direction transverse to the transport direction (T), with the compartments being aligned next to one another, whereby the veneers have to primarily only be moved in the transport direction during transfer to the transporting device.

2. The device according to claim 1, wherein an adjustment device is arranged to move the transport device (2) relative to the transport plane (TE), wherein by means of the adjustment device, an angle between an oblique plane formed by the transport device (2) and the transport plane (TE) can be varied between 10° and 60° and/or the vertical distance from the lower end of the transport device (2) to the transport plane (TE) is adjustable.

3. The device according to claim 1, wherein the means for transferring are designed as a vacuum cup.

4. The device according to claim 1, further comprising a vacuum device for generating a vacuum applied to the transport device (2) to fix the veneer strips to the transport device (2).

5. The device according to claim 1, further comprising positioning guides for prepositioning the veneer strips (8) in the veneer magazine (4).

6. The device according to claim 1, wherein a device for moving the veneer strips (8) is arranged on the transport device in a direction transverse to the transport direction (T).

7. The device according to claim 1, further comprising a monitoring system for detecting the position of the veneer strips (8) on the transport device (2).

8. The device according to claim 1, further comprising a synchronization device for synchronizing the transport of the support panel (3) with the transport device (2).

9. The device according to claim 1, wherein at least two veneer magazines (4) are arranged sequentially in the transport direction (T) of the veneer strips (8).

10. A method for depositing veneer strips (8) on a support panel (3), comprising the steps of:
positioning at least two veneer strips (8) next to each other and at a predefined distance to each other on a transport device (2) by moving the veneer strips (8) only in the transport direction,
moving the veneer strips (8) by the transport device (2) along a plane angled obliquely downward to a lower end of the transport device (2),
simultaneously transferring the veneer strips (8) by the transport device (2) onto a support panel (3) such that the veneer strips (8) are deposited on the support panel (3) next to each other, and at a predetermined distance from each other on the support plate (3), wherein the veneer strips (8) are inserted into a veneer magazine (4) and/or compartments (7) of the veneer magazine (4), and the veneer magazine (4) and/or the compartments (7) are moved to be pre-positioned transversely to the transport direction (T).

11. The method according to claim 10, wherein the veneer strips (8) are detected on the transport device (2) by a monitoring system and moved transversely to the transport direction (T) when there is a deviation from a target position.

12. The method according to claim 10, wherein the transport of the veneer strips (8) is adapted to a transport of the support panel (3) so that the longitudinal position of the veneer strips (8) is adapted to the support panel (3).

13. The device according to claim 1, wherein the veneer magazine (4) comprises three to ten adjacently arranged compartments (7).

14. The device according to claim 1, wherein the transport device (2) is designed to transport three to ten adjacently arranged veneer strips (8).

15. The device according to claim 1, wherein the transport device is configured to be adjustable relative to the transport plane (TE) such that an angle between the transport device and the transport place can be varied between 10° and 60° and/or a vertical distance from the lower end of the transport device (2) to the transport plane (TE) can be adjusted.

16. The device according to claim 1, wherein the transport device can be controlled to synchronize transport of the veneers with movement of the support panel (3).

* * * * *